…

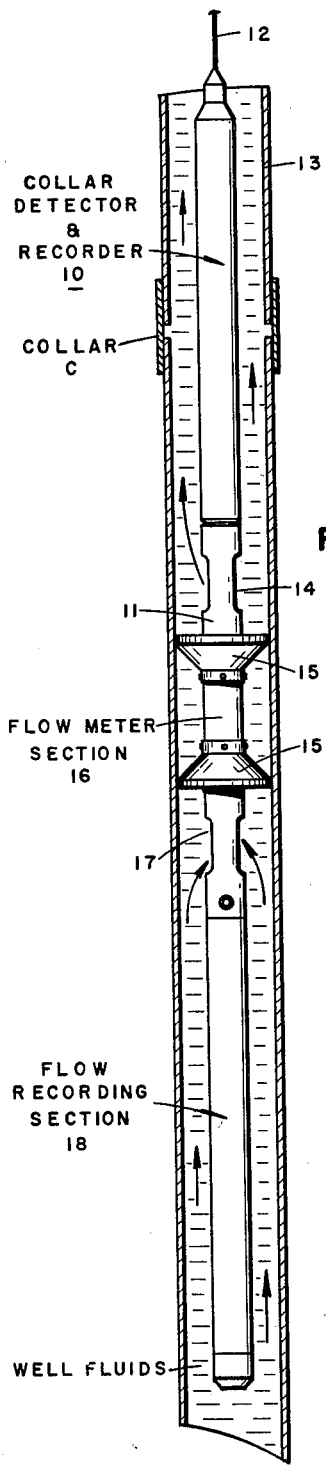

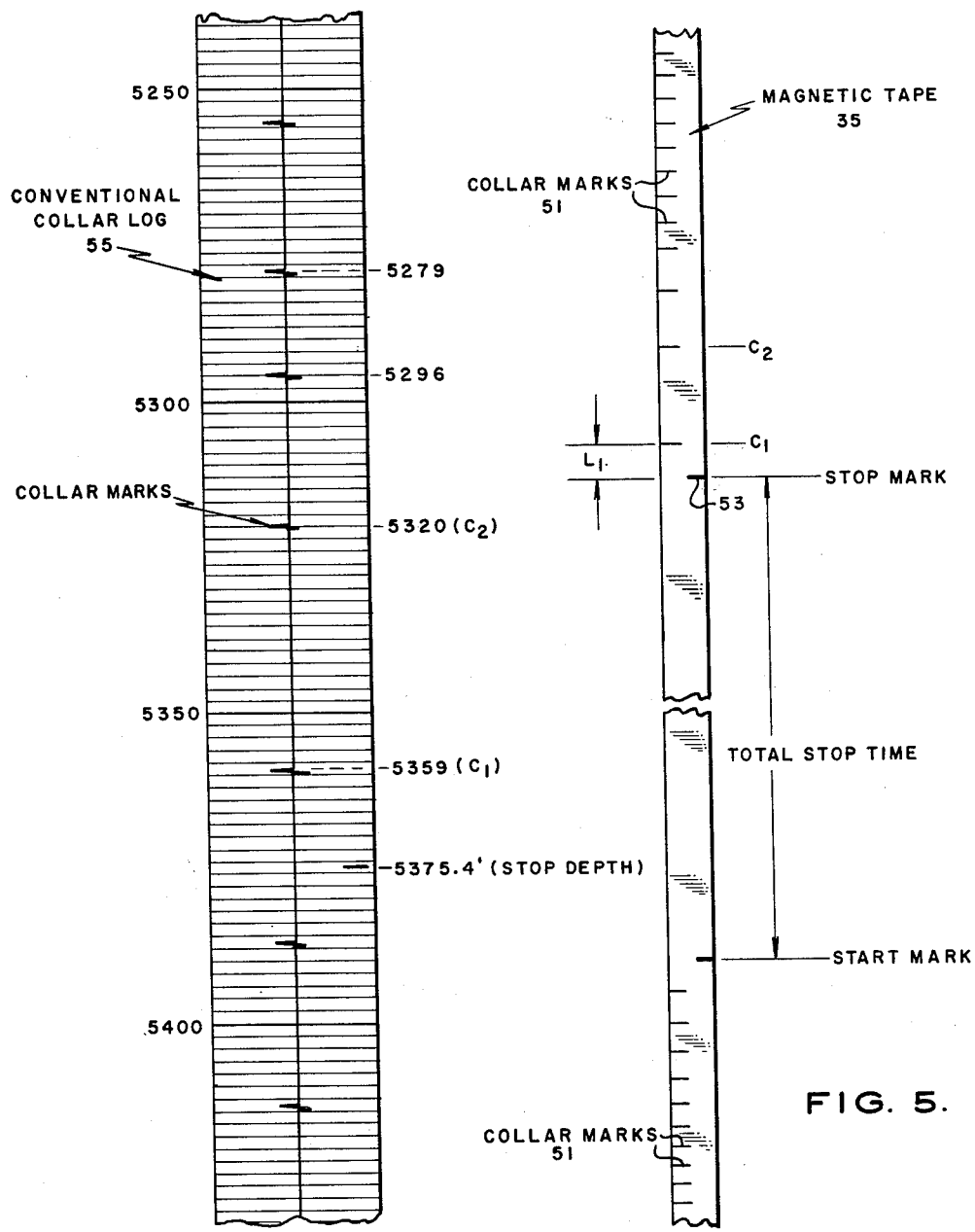

United States Patent Office 3,163,487
Patented Dec. 29, 1964

3,163,487
SUBSURFACE RECORDING COLLAR LOCATOR
Henry M. Buck, Houston, Tex., assignor, by mesne assignments, to Jersey Production Research Company, Tulsa, Okla., a corporation of Delaware
Filed July 1, 1963, Ser. No. 291,930
4 Claims. (Cl. 346—33)

The present invention concerns an improved subsurface recording wire line collar locator especially adaptable for use with other subsurface recording logging instruments such as flowmeters and thermometers.

When conducting surveys in wells with logging instruments suspended on solid wire lines, the accuracy of the depth readings of the odometer attached to the wire line at the surface is affected by several factors such as wire line stretch, instrument weight, well fluid density, and well fluid flow rate; and consequently, the true depth of the instrument at any particular time is not known. In some wells the error in the depth reading is as much as 6 to 8 ft. Knowledge of the exact depth of the instrument is important especially in wells which have two or more closely spaced zones open to fluid production or injection.

The present invention provides an improved solution to the problem of obtaining accurate information as to the depth location of instruments run in wells on non-conductor type solid wire lines.

The subsurface recording self-contained collar locator of the invention may be run in the well on a small diameter solid wire line alone, or as is preferred, in tandem with other wire line subsurface recording instruments to improve accuracy of depth control for either the collar locator itself or the wire line instrument run with it.

Thus, a primary object of the present invention is to provide an improved wire line apparatus for obtaining more accurate depth measurements.

Briefly, the apparatus of the invention comprises a pipe collar sensing means adapted to generate signals when passing the pipe collars of a pipe string in which the apparatus is suspended; accelerometer means adapted to generate signals in response to halting of movement of said collar locator; a recording medium adapted to be driven at constant speed for recording each of said signals; means for recording signals generated by said sensing means on said recording medium; means for recording said signals generated by said accelerometer on said recording medium; and means for transmitting each signal, respectively, to its respective recording means.

The above object and other objects and advantages of the invention will become apparent from a more detailed description of the invention when taken with the drawings wherein:

FIG. 1 is a vertical view, partly in section, showing the collar locator of the invention connected in tandem to a subsurface recording well instrument and suspended by a solid wire line in a well pipe;

FIG. 2 is a schematic view illustrating the general arrangement of the elements of the collar locator apparatus;

FIG. 3 is a view taken on lines 3—3 of FIG. 2;

FIG. 4 is a view of a representative, conventional collar log; and

FIG. 5 is a view of a representative collar locator tape taken in accordance with the practice of the invention.

In FIG. 1 is shown a collar detector and recorder 10 arranged in tanden with a flowmeter 11 and suspended on a solid non-conductor type wire line 12 in a pipe string 13, the sections of which are connected together by joints C. Flowmeter 11 may be of the type shown and described in application Serial No. 145,094, entitled "Subsurface Flowmeter," filed October 16, 1961, by E. Rich, L. A. Carlton, and B. A. Peters, which includes fluid flow outlets 14, flow diverters 15, a flowmeter section 16, fluid flow inlets 17, and a self-contained flow recording section 18.

Collar locator 10 is seen in greater detail in FIG. 2, and it includes a pipe collar sensing section 20, an accelerometer section 21, and a recorder section 22. Sensing section 20 includes a coil of wire 25 biased by permanent magnets 26 arranged at its ends. The accelromter section 21 includes a housing 27 on which is arranged an accelerometer coil 28 suspended for movement by a spring 29 from a fixed member 30. Coil 28 and housing 27 surround a magnet 31 which is shown mounted on the upper permanent magnet 26. If desired, housing 27 may be held stationary and magnet 31 may be mounted for movement.

The recording section 22 includes a magnetic tape 35, wound on spools 36a, b. Spool 36b is connected with a capstan drive 37 to allow slippage to provide constant speed for tape 35. Capstan drive 37 is driven by motor 38 powered by battery 39 through the gear arrangement 40. Head 45, provided with wire coil 46, records the collar sensing signals on magnetic tape 35 and adjacent to it, recording head 47, provided with wire coil 48, records accelerometer signals on magnetic tape 35.

In operation the subsurface recording collar locator 10, connected to flowmeter 11, is lowered in pipe string 13 suspended on wire line 12, with the tape 35 running on spools 36 at a constant speed, as for example, 2 in./minute. If not initially lowered at constant speed when the instruments approach the depth at which it is desired to take a flowmeter measurement, cable 12 is run out at a constant speed, as for example, 100 ft./minute. The approximate depth at which it is desired to take a reading is obtained from the original perforator collar log, such as that shown in FIG. 4. An electrical signal is generated in coil 25 when the magnetic bias of magnets 26 is disturbed as the detector 20 passes collars C in pipe string 13. The generated signal then is transmitted to the recording head 45 through line 50 which makes magnetic marks 51 (see FIG. 5) on tape 35. At a desired depth for taking flow measurements, lowering of wire line 12 is abruptly halted. This causes housing 27 and accelerometer coil 28 to move downwardly on magnet 31 and thereby generate a signal in coil 28. This signal is transmitted to recording head 47 through lead 52 to cause a magnetic mark 53 on tape 35. The magnetic marks on the recording tape are made visible by applying to the tape a mixture of magnetic powder suspended in carbon tetrachloride.

Reference is now made to FIGS. 4 and 5 for a description of the manner for obtaining a correction factor for the wire line collar locator.

The distance on magnetic tape 35 between any two collar marks adjacent stop 53, preferably the two next above the stop mark ($C_1$ and $C_2$), is measured in inches. The distance between the same two collars in feet (5,359 −5,320=39 ft.) is known from the pipe collar marks on pipe collar log 55. The distance in inches on the tape between collars $C_1$ and $C_2$ is divided into the distance in feet between these collars to give feet of pipe per inch of tape and this ratio is multiplied by the distance in inches on the tape between collar mark $C_1$ and stop mark 53 ($L_1$), to give the distance in feet between collar mark $C_1$ and the stop mark 53. When this distance is added to the depth of the collar $C_1$, the true depth of the stop point is obtained. The difference between this obtained depth and the odometer reading of the depth of the collar locator gives the correction factor to be applied to any other odometer depth readings at which other flowmeter readings were made. The calculations for an actual test are shown in the following table.

These same data are used in FIGS. 4 and 5. One or more additional calculations using other pipe collars (as illustrated) may be made as a check.

| Depth (Collar Log) | Pipe (Ft.) | Tape (In.) | Calculation |
|---|---|---|---|
| Stop | (L₁) | .113 | 5,359+16.4=5,375.4 |
| 5,359 | 0 | 0 | |
| 5,320 | 39 | .269 | $\frac{39}{.269} \times .113 = 16.4$ |
| 5,296 | 63 | .435 | $\frac{63}{.435} \times .113 = 16.4$ |

Assuming for purposes of illustration that the odometer reading at stop 53 is 5,380 ft., then the correction factor is 5,380.0 −5,375.4=4.6 ft.

Following the first stop to establish the correction factor, flowmeter readings can be made at the stop depth and then at various depth intervals. True depth measurements are then found by correcting the odometer readings with the calculated correction factor.

The collar locator has been described in conjunction with a flowmeter herein only for purposes of illustration. It is useful with any wire line instrument, such as a subsurface thermometer used in making temperature surveys where knowledge of the postion of the instrument in the well is needed with great accuracy.

Having fully described the nature, operation, apparatus and objects of my invention, I claim:

1. A self-contained, subsurface recording collar locator comprising:
   a pipe collar sensing means adapted to generate signals when passing the pipe collars of a pipe string in which said pipe collar locator is suspended;
   an accelerometer means adapted to generate signals when said collar locator movement is halted;
   a recording medium for recording said sensing means signals and said accelerometer signals;
   means for recording said sensing means signals on said recording medium;
   means for recording said accelerometer signals on said recording medium; and
   circuit means for transmitting said signals to their respective recording means.

2. A self-contained, subsurface recording wire line collar locator comprising:
   an electrically operable pipe collar sensing means adapted to generate electrical signals in response to the location of pipe collars of a pipe string in which said locator is suspended;
   an electrically operable accelerometer adapted to generate electrical signals in response to halting of movement of said locator;
   a movable recording medium on which to record said sensing means signals and said accelerometer signals;
   means for moving said recording medium at constant speed;
   means for recording said sensing means signals on said recording medium; and
   means for recording said accelerometer signals on said recording medium.

3. A self-contained, subsurface recording wire line collar locator comprising:
   an electrically operable pipe collar detector adapted to generate electrical signals in response to the location of pipe collars of a pipe string in which said locator is suspended;
   an accelerometer adapted to generate electrical signals in response to halting of movement of said locator;
   a movable magnetic tape adapted to record said sensing means signals and said accelerometer signals;
   means for moving said magnetic tape at constant speed;
   a first magnetic head for recording said sensing signals on said recording medium; and
   a second magnetic head for recording said accelerometer signals on said recording tape.

4. A self-contained, subsurface recording wire line collar locator comprising:
   a pipe collar sensing means including a coil of wire biased by permanent magnets adapted to generate signals when passing the pipe collars of a pipe string in which said pipe collar locator is suspended;
   an accelerometer including a coil surrounding a magnet arranged so that acceleration of the collar locator causes relative motion between coil and magnet and thereby the generation of signals;
   a recording magnetic tape for recording said sensing means signals and said accelerometer signals;
   means for moving said magnetic tape at constant speed;
   a first magnetic head adapted to record the occurrence of said sensing means signals on said magnetic tape;
   a second magnetic head adapted to record the occurrence of said accelerometer signals on said magnetic tape; and
   circuit means for transmitting said sensing means signals and said accelerometer signals to their respective recording heads.

References Cited in the file of this patent

UNITED STATES PATENTS

| | | |
|---|---|---|
| 1,065,501 | Bishop | June 24, 1913 |
| 1,838,389 | Goldberg | Dec. 29, 1931 |
| 1,955,855 | Marx | Apr. 24, 1934 |
| 2,250,703 | Crites et al. | July 29, 1941 |
| 2,265,098 | Bettis | Dec. 2, 1941 |
| 2,359,894 | Brown et al. | Oct. 10, 1944 |
| 2,401,280 | Walstrom | May 28, 1946 |
| 2,479,518 | Scherbatskoy | Aug. 16, 1949 |
| 2,488,491 | Davis | Nov. 15, 1949 |
| 2,543,532 | Neufeld | Feb. 27, 1951 |
| 2,558,427 | Fagan | June 26, 1951 |
| 2,580,544 | Herzog | Jan. 1, 1952 |
| 2,664,542 | Lynn | Dec. 29, 1953 |
| 2,707,768 | Owen | May 3, 1955 |
| 2,782,365 | Castel | Feb. 19, 1957 |
| 2,814,019 | Bender | Nov. 19, 1957 |
| 2,853,788 | Kinley | Sept. 30, 1958 |
| 2,879,126 | James | Mar. 24, 1959 |
| 2,888,309 | Tanguy | May 26, 1959 |
| 3,020,354 | McGowen | Feb. 6, 1962 |
| 3,035,479 | Baltosser et al. | May 22, 1962 |
| 3,060,315 | Scherbatskoy | Oct. 23, 1962 |
| 3,065,406 | Mayes | Nov. 20, 1962 |
| 3,088,068 | Hall et al. | Apr. 30, 1963 |